United States Patent
Miao et al.

(10) Patent No.: US 12,034,403 B1
(45) Date of Patent: Jul. 9, 2024

(54) VENTILATION-TYPE SOLAR PHOTOVOLTAIC SELF-HEAT-PRESERVATION OUTER WALL SYSTEM AND CONSTRUCTION METHOD THEREOF

(71) Applicants: Shandong Jianzhu University, Jinan (CN); Shandong Qixing Industrial Co., Ltd., Jinan (SD)

(72) Inventors: Jikui Miao, Jinan (CN); Yongxiao Zheng, Jinan (CN); Hongwen Yu, Jinan (CN); Dongyu Zhang, Jinan (CN)

(73) Assignees: Shandong Jianzhu University, Jinan (CN); Shandong Qixing Industrial Co., Ltd., Jinan (CN)

( * ) Notice: Subject to any disclaimer, the term of this patent is extended or adjusted under 35 U.S.C. 154(b) by 0 days.

(21) Appl. No.: 18/534,424

(22) Filed: Dec. 8, 2023

(30) Foreign Application Priority Data

Jan. 9, 2023 (CN) .......................... 202310029480.3

(51) Int. Cl.
*H02S 20/32* (2014.01)
*H02S 40/42* (2014.01)

(52) U.S. Cl.
CPC ............ *H02S 40/425* (2014.12); *H02S 20/32* (2014.12)

(58) Field of Classification Search
CPC ....... H01L 31/00–078; Y02E 10/50–60; H02S 20/00–26; H02S 30/10
USPC .................................................. 136/243–265
See application file for complete search history.

(56) References Cited

FOREIGN PATENT DOCUMENTS

| CN | 2910963 Y | | 6/2007 |
|---|---|---|---|
| CN | 102373757 A | * | 3/2012 |
| CN | 102373757 A | | 3/2012 |
| CN | 208519943 U | | 2/2019 |
| CN | 217461066 A | | 9/2022 |
| CN | 217811800 U | | 11/2022 |
| JP | 2017179982 A | | 10/2017 |
| KR | 20100007240 A | * | 1/2010 |
| KR | 101997391 B1 | * | 7/2019 |

OTHER PUBLICATIONS

KR-20100007240-A English (Year: 2010).*
CN-102373757-A English (Year: 2012).*
KR-101997391 English (Year: 2019).*

* cited by examiner

*Primary Examiner* — Bach T Dinh

(57) ABSTRACT

The invention provides a ventilation-type solar photovoltaic self-heat-preservation outer wall system and a construction method thereof, and relates to the technical field of constructional engineering. According to the solution, the ventilation-type solar photovoltaic self-heat-preservation outer wall system comprises an inner-layer heat preservation structure and an outer-layer photovoltaic assembly, a ventilation gap is formed between the inner-layer heat preservation structure and the outer-layer photovoltaic assembly, a flow guide component is arranged in the ventilation gap, the outer-layer photovoltaic assembly is provided with a ventilation opening, and the ventilation opening is communicated with the ventilation gap. The achieved effects are good heat preservation and heat insulation performances, good ventilation and heat dissipation effects, easy mounting and dismounting, and economical and applicable performances.

4 Claims, 5 Drawing Sheets

VENTILATION-TYPE SOLAR PHOTOVOLTAIC SELF-HEAT-PRESERVATION OUTER WALL SYSTEM AND CONSTRUCTION METHOD THEREOF

CROSS REFERENCE TO RELATED APPLICATIONS

This application claims foreign priority of Chinese Patent Application No. 202310029480.3, filed on Jan. 9, 2023 in the China National Intellectual Property Administration, the disclosures of all of which are hereby incorporated by reference.

TECHNICAL FIELD

The present invention relates to the technical field of constructional engineering, and particularly to a ventilation-type solar photovoltaic self-heat-preservation outer wall system and a construction method thereof.

BACKGROUND OF THE PRESENT INVENTION

As a clean and renewable energy source, solar energy has a broad application prospect. With the rapid development of solar photovoltaic technology, the integration of photovoltaic generation and building is becoming an important direction of energy saving and carbon reduction in construction industry. At present, a photovoltaic outer wall used in engineering practice is mainly in a form of photovoltaic curtain wall, and mostly used in large-scale public buildings such as a commercial building, but the prior art has the following problems.

1. For ordinary houses and office buildings, the photovoltaic curtain wall has a poor heat insulation performance, which cannot meet the requirement of thermal performance design of wall body in frigid and cold regions, and residual heat generated by a photovoltaic panel in summer has a great influence on an indoor thermal environment.

2. A photovoltaic double-layer glass curtain wall may take away the residual heat generated by the photovoltaic panel through a ventilation interlayer, but a flow guide measure is not considered in the ventilation interlayer, so that the internal airflow distribution is poor, the ventilation and heat exchange efficiency is low, and a heat flow in the ventilation interlayer cannot be discharged in time.

3. The photovoltaic curtain wall needs to be cleaned and maintained regularly in use, and damaged parts need to be replaced in time, but the photovoltaic curtain wall is complex in structural form and difficult to mount and dismount, thus being not convenient for the later maintenance and repair of the photovoltaic panel.

4. An outer-layer photovoltaic assembly product has fixed size and specification and does not adapt to a building modulus, and it is necessary to customize the specification of the outer-layer photovoltaic assembly product in application, thus being expensive and difficult to achieve large-scale promotion.

In view of this, it is urgent to put forward a novel photovoltaic outer wall system with good heat preservation and heat insulation performances, good ventilation and heat dissipation effects, easy mounting and dismounting, and economical and applicable performances, so as to solve many technical problems in the prior art.

SUMMARY OF THE PRESENT INVENTION

The present invention aims to propose and design a ventilation-type solar photovoltaic self-heat-preservation outer wall system with good heat preservation and heat insulation performances and good ventilation and heat dissipation effects and a construction method thereof mainly aiming at the problems of poor heat preservation and heat insulation performances and poor ventilation and heat dissipation effects of a photovoltaic curtain wall in the prior art.

In one aspect, a technical solution used in the present invention to solve the above technical problems is: a ventilation-type solar photovoltaic self-heat-preservation outer wall system, which comprises an inner-layer heat preservation structure and an outer-layer photovoltaic assembly, wherein a ventilation gap is formed between the inner-layer heat preservation structure and the outer-layer photovoltaic assembly, a flow guide component is arranged in the ventilation gap, the outer-layer photovoltaic assembly is provided with a ventilation opening, and the ventilation opening is communicated with the ventilation gap. The requirements of stress and thermal performance design of the outer wall are met by arranging the inner-layer heat preservation structure on an inner side; the outer-layer photovoltaic assembly is arranged on an outer side for photoelectric conversion of solar energy; the ventilation gap is reserved between the outer-layer photovoltaic assembly and the inner-layer heat preservation structure, and provided with the flow guide component for adjusting airflow distribution, thus improving the ventilation and heat exchange of the outer-layer photovoltaic assembly, solving the heat dissipation problem of the outer-layer photovoltaic assembly in a working state, and improving the photoelectric conversion efficiency; and the outer-layer photovoltaic assembly is provided with the ventilation opening communicated with the ventilation gap for controlling exchange of internal and external airflows, thus adjusting a temperature of an inner flow field in the ventilation gap.

Further, the inner-layer heat preservation structure comprises a structural beam and a heat preservation and structure integrated wallboard, the heat preservation and structure integrated wallboard is mounted between upper and lower structural beams, and the flow guide component is located on an outer side of the heat preservation and structure integrated wallboard. Further, the heat preservation and structure integrated wallboard is connected with the upper and lower structural beams through wallboard connectors to be fixed, and the heat preservation and structure integrated wallboard is fixed between two adjacent structural beams.

Further, the heat preservation and structure integrated wallboard protrudes outwards from the structural beam, the structural beam is connected with a heat preservation plate, the heat preservation plate is located on an outer side of the structural beam, and an outer side surface of the heat preservation plate is basically flush with an outer side surface of the heat preservation and structure integrated wallboard, and because the heat preservation plate is thinner than the wallboard, when the heat preservation plate is mounted on the structural beam to preserve heat at the structural beam, a gap between the outward protruding part of the heat preservation and structure integrated wallboard and the structural beam can be exactly filled, and the heat preservation and structure integrated wallboard fills a gap between the upper and lower structural beams, so as to lay a heat preservation layer in a more all-round way, thus achieving a better heat preservation effect.

Further, a wall surface leveling and facing structure is arranged on the outer sides of the heat preservation and structure integrated wallboard and the heat preservation plate, and preferably, the wall surface leveling and facing structure may be divided into a heat preservation slurry leveling layer and a plastering layer, the plastering layer is pressed into a glass fiber mesh, and a facing layer is formed. Leveling, plastering and facing treatments are performed to achieve leveling, anti-cracking and facing effects, so as to realize the flatness and beautiful appearance of the inner-layer heat preservation structure.

Because the photovoltaic curtain wall needs to be cleaned and maintained regularly in use, and damaged parts need to be replaced in time, but the photovoltaic curtain wall is complex in structural form and difficult to mount and dismount, thus being not convenient for the later maintenance and repair of the photovoltaic panel, and in order to solve this problem, a further improvement solution is that a supporting framework is arranged on the outer side of the heat preservation and structure integrated wallboard, and the outer-side photovoltaic assembly is detachably mounted on the supporting framework.

Further, the supporting framework is connected to the structural beam through a T-shaped connecting assembly, the T-shaped connecting assembly is provided with an adjusting member, and the adjusting member is capable of adjusting a position of the supporting framework. The position of the supporting framework is finely adjusted, thus adjusting a position of the outer-layer photovoltaic assembly, so as to achieve the purpose of convenient mounting and dismounting and adjustment.

Further, the supporting framework comprises two vertical uprights, a crosspiece is fixedly connected between the two vertical uprights to form a framework with reliable structural strength, clamping members are arranged on the crosspiece and the vertical upright, the clamping members are preferred in this solution, and the outer-layer photovoltaic assembly is connected to the clamping members. The clamping-type connection is formed through the clamping members, so as to facilitate the mounting and dismounting of the outer-layer photovoltaic assembly and the coordination of specification of the outer-layer photovoltaic assembly.

Further, the T-shaped connecting assembly comprises a T-shaped steel plate and a metal anchor bolt, the T-shaped steel plate is connected to the structural beam through the metal anchor bolt, and in some solutions, a polyurethane pad is arranged between the T-shaped steel plate and the structural beam. An obround hole is arranged in the T-shaped steel plate, the adjusting member is mounted in the obround hole, the adjusting member is preferably a bolt, the adjusting member connects the T-shaped steel plate with the vertical uprights of the supporting framework, the T-shaped steel plate is adopted, a bottom plate of which is capable of being in large-area contact with the structural beam and being screwed into the structural beam through the metal anchor bolt, so as to ensure the firm strength of fixation, the protruding plate is capable of extending to the outside by a certain distance, which is beneficial for connecting the supporting framework, and the adjusting member and the obround hole are provided to realize the fine adjustment of the position of the supporting framework.

Further, the flow guide component comprises the plurality of flow guide plates arranged at intervals, the plurality of flow guide plates are connected through connecting rods, two ends of the connecting rods are connected to the vertical uprights of the supporting framework, and the flow guide plates are located between the two vertical uprights. The flow guide plates are vertically mounted and arranged in parallel to achieve the purpose of flow guide, the supporting framework provides mounting positions for the flow guide plates and the outer-layer photovoltaic assembly, so that the effect of convenient mounting and dismounting is achieved, and the ventilation gap is reserved.

Further, the outer-layer photovoltaic assembly comprises a frame and a photovoltaic panel, the photovoltaic panel is mounted on the frame, and the frame is connected to the supporting framework through the clamping members. The photovoltaic panel is made of monocrystalline silicon, polycrystalline silicon or a compound photovoltaic material.

Further, the supporting framework is provided with the ventilation louvers, the ventilation louvers are connected with the supporting framework through the clamping members and located on an outer side the ventilation gap, the ventilation louvers are evenly arranged above and below the photovoltaic panel, and the ventilation opening is located at the ventilation louvers. The ventilation louvers may be stainless steel ventilation louvers, aluminum alloy ventilation louvers, and the like.

Further, the heat preservation and structure integrated wallboard may be selected from a lightweight concrete self-heat-preservation wallboard, a lightweight concrete composite heat preservation wallboard or a lightweight concrete sandwich heat preservation wallboard.

Further, the heat preservation plate may be a rock wool plate, a polyurethane plate, a polystyrene plate, a phenolic plate or a prefabricated composite heat preservation plate.

Further, the heat preservation slurry leveling layer is made of a rubber powder polyphenyl particle heat preservation slurry or a vitrified micro-bead heat preservation slurry, and the slurry has a combustion performance not lower than an A2 grade and a thickness of 7 mm to 25 mm, thus achieving the leveling and fireproof protection effects on the wall surface.

Further, the plastering layer is made of polymer cement mortar, and a glass fiber mesh is pressed into the plastering layer, so as to improve an anti-cracking capability of the plastering layer.

Further, the facing layer may be made of flexible water-resistant putty and elastic coating, which plays an aesthetic and decorative role.

In the above solution, the requirements of stress and thermal performance design of the outer wall are met by arranging the heat preservation and structure integrated wallboard on an inner side; the outer-layer photovoltaic assembly is arranged on an outer side for photoelectric conversion of solar energy; the ventilation gap is reserved between the outer-layer photovoltaic assembly and the heat preservation and structure integrated wallboard on the inner side, and provided with the flow guide plates in a width direction for adjusting airflow distribution, thus improving the ventilation and heat exchange of the outer-layer photovoltaic assembly, solving the heat dissipation problem of the outer-layer photovoltaic assembly in a working state, and improving the photoelectric conversion efficiency; the ventilation openings are reserved and the ventilation louvers are provided at certain intervals in a height direction in the ventilation gap for controlling the exchange of internal and external airflows and adjusting a temperature of a flow field in the ventilation gap; the supporting framework of the outer-layer photovoltaic assembly is connected with the structural beam through the T-shaped connecting assembly, and the obround hole is arranged in the T-shaped connecting assembly to achieve mounting adjustability of the supporting framework and the main structure; and the outer-layer photovoltaic assembly is fixed on the supporting framework through the clamping members, and the outer-layer photovoltaic assembly achieves modulus adjustability in a mounting process, thus achieving easy mounting and dismounting and convenient later maintenance.

In another aspect, the present invention further provides a construction method of a ventilation-type solar photovoltaic self-heat-preservation outer wall system, which comprises the following steps of:

step S1: drawing a layout diagram of a heat preservation and structure integrated wallboard:
drawing the layout diagram of the heat preservation and structure integrated wallboard according to a wallboard specification, a gap width and external wall door and window opening information, and determining numbers and positions of heat preservation and structure integrated wallboards and wallboard connectors;

step S2: mounting the heat preservation and structure integrated wallboard:
according to the layout diagram of the heat preservation and structure integrated wallboard, ejecting a mounting control line on a main structure, and after the heat preservation and structure integrated wallboard is placed in place, connecting and fixing the heat preservation and structure integrated wallboard with a structural beam through the wallboard connectors;

step S3: fixing a T-shaped connecting assembly:
according to a mounting position of the T-shaped connecting assembly, ejecting the mounting control line on the structural beam, drilling a hole in the structural beam by a drilling machine according to the mounting control line and cleaning a surface, pressing a layer of polyurethane pad on a back surface of a T-shaped base, driving a metal anchor bolt into the hole in the structural beam through an obround hole in the T-shaped base, and connecting the T-shaped base with the structural beam through the metal anchor bolt, a gasket and a nut;

step S4: performing local heat bridge treatment:
according to sizes of heat bridge parts of a beam and a column of an outer structure, connecting a processed heat preservation plate to the heat bridge parts to be located on outer sides of the heat bridge parts;

step S5: constructing a wall surface leveling and facing structure:
scraping a layer of heat preservation slurry on surfaces of the heat preservation and structure integrated wallboard and the heat preservation plate as a heat preservation slurry leveling layer of an outer wall surface, wherein a thickness of the heat preservation slurry is 7 mm to 25 mm;
after the heat preservation slurry leveling layer of the outer wall surface is dried, scraping a layer of polymer cement mortar and pressing a glass fiber mesh into the layer, wherein a thickness of the polymer cement mortar is 3 mm to 5 mm; and
after the plastering layer of polymer cement mortar is dried, coating a facing layer on an outer side of the plastering layer;

step S6: mounting vertical uprights:
fixing the vertical uprights of the supporting framework on the T-shaped connecting assembly mounted in place, finely adjusting the vertical uprights through the obround holes in the T-shaped connecting assembly, and connecting the vertical uprights through preset bolts and nuts;

step S7: fixing flow guide plates:
according to ventilation design in a ventilation gap, fixing the flow guide plates in given specification and number on connecting rods as a flow guide component, and fixing the flow guide plates on the vertical uprights through the connecting rods;

step S8: fixing a crosspiece:
fixing the crosspiece in a designated position of the vertical upright, and connecting the crosspiece with the vertical upright through a special connecting assembly; and step S9: mounting the outer-layer photovoltaic assembly and the ventilation louvers:
according to mounting positions of the outer-layer photovoltaic assembly and the ventilation louvers, fixing the outer-layer photovoltaic assembly and the ventilation louvers on the supporting framework through preset clamping members.

It can be seen from the above technical solution that the present invention has the following advantages.

1. The outer wall system has good heat preservation and heat insulation performances. The heat preservation and structure integrated wallboard meets the requirement of thermal performance design of the outer wall, and the local structural heat bridge parts are subjected to heat insulation treatment, so as to meet the requirement of thermal performance design of wall body in frigid and cold regions 2. Remarkable ventilation and heat dissipation effects are achieved. The ventilation gap reserved between the outer-layer photovoltaic assembly and the heat preservation and structure integrated wallboard on the inner side is internally provided with the flow guide plates, which may adjust airflow distribution, thus improving the ventilation and heat dissipation efficiencies of the outer-layer photovoltaic assembly, and the ventilation louvers arranged in the height direction of the ventilation gap may control the exchange of internal and external airflows according to a change of outdoor climate environment, thus adjusting the temperature of the flow field in the ventilation gap, and improving the photoelectric conversion efficiency of the outer-layer photovoltaic assembly.

3. Easy mounting and dismounting and convenient later maintenance of the outer-layer photovoltaic assembly are achieved. The outer-layer photovoltaic assembly is fixed on the supporting framework through the clamping members, and the supporting framework is fixed on the structural beam through the T-shaped connecting assembly, so that a mounting and dismounting process is easy, the requirement of external connection of the outer-layer photovoltaic assembly is met, and the later maintenance is convenient.

4. Reasonable construction and economical and applicable performances are achieved. According to the construction of the photovoltaic outer wall system, the supporting framework is used to coordinate the specification of the outer-layer photovoltaic assembly, which solves the problem of uncoordination between a building modulus and a modulus of the outer-layer photovoltaic assembly, is convenient for mounting the outer-layer photovoltaic assemblies with different specifications and sizes on an outer wall of a building, and avoids an extra cost caused by customized production of the outer-layer photovoltaic assembly, thus being convenient for large-scale promotion.

DESCRIPTION OF THE DRAWINGS

In order to illustrate technical solutions of the present invention more clearly, the drawings used in the descriptions will be briefly introduced below. Obviously, the drawings in the following descriptions are merely some embodiments of the present invention. For those of ordinary skills in the art, other drawings may also be obtained based on these drawings without going through any creative work.

Figure 1:
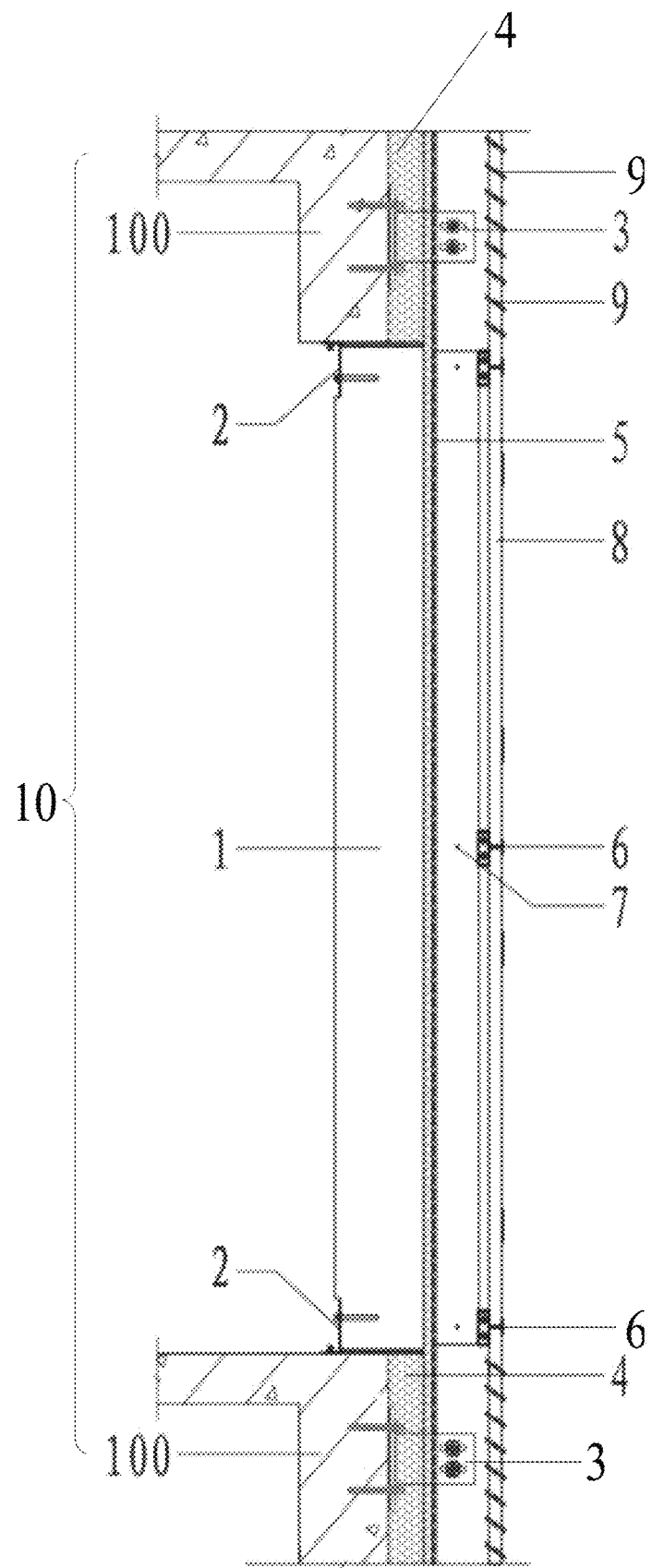
FIG. 1 is a schematic structural diagram of a ventilation-type solar photovoltaic self-heat-preservation outer wall system.

In the drawings: 1 refers to heat preservation and structure integrated wallboard; 2 refers to wallboard connector; 3 refers to T-shaped connecting assembly; 31 refers to T-shaped steel plate; 32 refers to metal anchor bolt; 33 refers to bolt; 34 refers to nut; 35 refers to gasket; 36 refers to polyurethane pad; 4 refers to heat preservation plate; 5 refers to wall surface leveling and facing structure; 51 refers to heat preservation slurry leveling layer; 52 refers to plastering layer; 53 refers to facing layer; 6 refers to supporting framework; 61 refers to vertical upright; 62 refers to crosspiece; 63 refers to clamping member; 7 refers to flow guide component; 71 refers to flow guide plate; 72 refers to connecting rod; 8 refers to outer-layer photovoltaic assembly; 81 refers to photovoltaic panel; 82 refers to frame; 9 refers to ventilation louver; and 100 refers to structural beam.

DETAILED DESCRIPTION OF PREFERRED EMBODIMENTS

In order to make the objects, features and advantages of the present invention more obvious and easier to understand, technical solutions in the present invention are clearly and completely described hereinafter with reference to the drawings in specific embodiments. Obviously, the embodiments described hereinafter are only some but not all of the embodiments of the present invention. Based on the embodiments in the patent, all other embodiments obtained by those of ordinary skills in the art without going through any creative work should fall within the scope of protection of the patent.

Specific Embodiment 1

As shown in FIG. 1, this specific embodiment provides a ventilation-type solar photovoltaic self-heat-preservation outer wall system, which comprises a heat preservation and structure integrated wallboard 1, a wallboard connector 2, a T-shaped connecting assembly 3, a heat preservation plate 4, a wall leveling and facing structure 5, a supporting framework 6, a flow guide component 7, an outer-layer photovoltaic assembly 8 and ventilation louvers 9. The heat preservation and structure integrated wallboard 1 is connected with upper and lower structural beams 100 through the wallboard connectors 2; the T-shaped connection assembly 3 is fixed on the structural beam 100 through a metal anchor bolt 32; the heat preservation plate 4 is connected to the structural beam 100 to be located on an outer side the structural beam 100; the supporting framework 6 is connected with the T-shaped connecting assembly 3 through preset bolt 33 and nut 34; the flow guide component 7 is fixed on vertical uprights 61 of the supporting framework 6 through connecting rods 72; and the outer-layer photovoltaic assembly 8 and the ventilation louvers 9 are fixed on the supporting framework 6 through preset clamping members 63.

The heat preservation and structure integrated wallboard 1 may be selected from a lightweight concrete self-heat-preservation wallboard, a lightweight concrete composite heat preservation wallboard or a lightweight concrete sandwich heat preservation wallboard.

Figure 2:
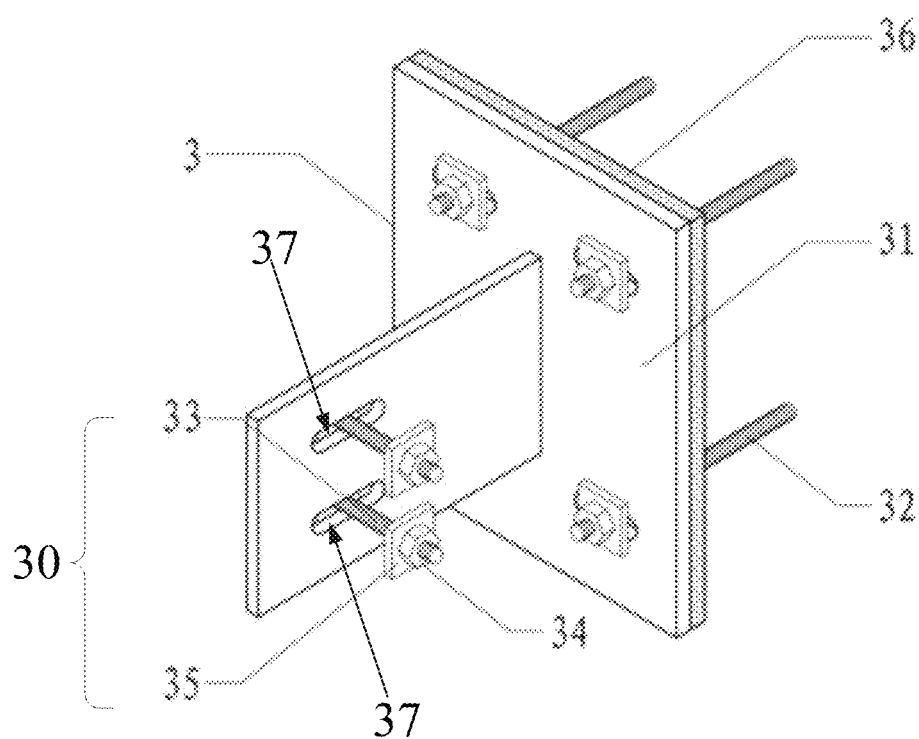
FIG. 2 is a schematic structural diagram of a T-shaped connecting assembly.

As shown in FIG. 2, the T-shaped connecting assembly 3 is mainly formed by connecting a T-shaped steel plate 31, the metal anchor bolt 32, the bolt 33, the nut 34, a gasket 35 and a polyurethane pad 36, an obround hole is arranged in the T-shaped steel plate 31, the metal anchor bolt 32 is used for connecting the T-shaped connecting assembly 3 with the structural beam 100, and the bolt 33 is used for connecting the T-shaped connecting assembly 3 with the vertical uprights 61 of the supporting framework 6.

The heat preservation plate 4 may be a rock wool plate, a polyurethane plate, a polystyrene plate, a phenolic plate or a prefabricated composite heat preservation plate.

The wall leveling and facing structure 5 comprises a heat preservation slurry leveling layer 51, a plastering layer 52 and a facing layer 53, which are arranged in this way from the inside to the outside.

The heat preservation slurry leveling layer 51 is made of a rubber powder polyphenyl particle heat preservation slurry or a vitrified micro-bead heat preservation slurry, and the slurry has a combustion performance not lower than an A2 grade and a thickness of 7 mm to 25 mm, thus achieving the leveling and fireproof protection effects on the wall surface.

The plastering layer 52 is made of polymer cement mortar, and a glass fiber mesh is pressed into the plastering layer 52, so as to improve an anti-cracking capability of the plastering layer.

The facing layer 53 may be made of flexible water-resistant putty and elastic coating, which plays an aesthetic and decorative role.

Figure 3:
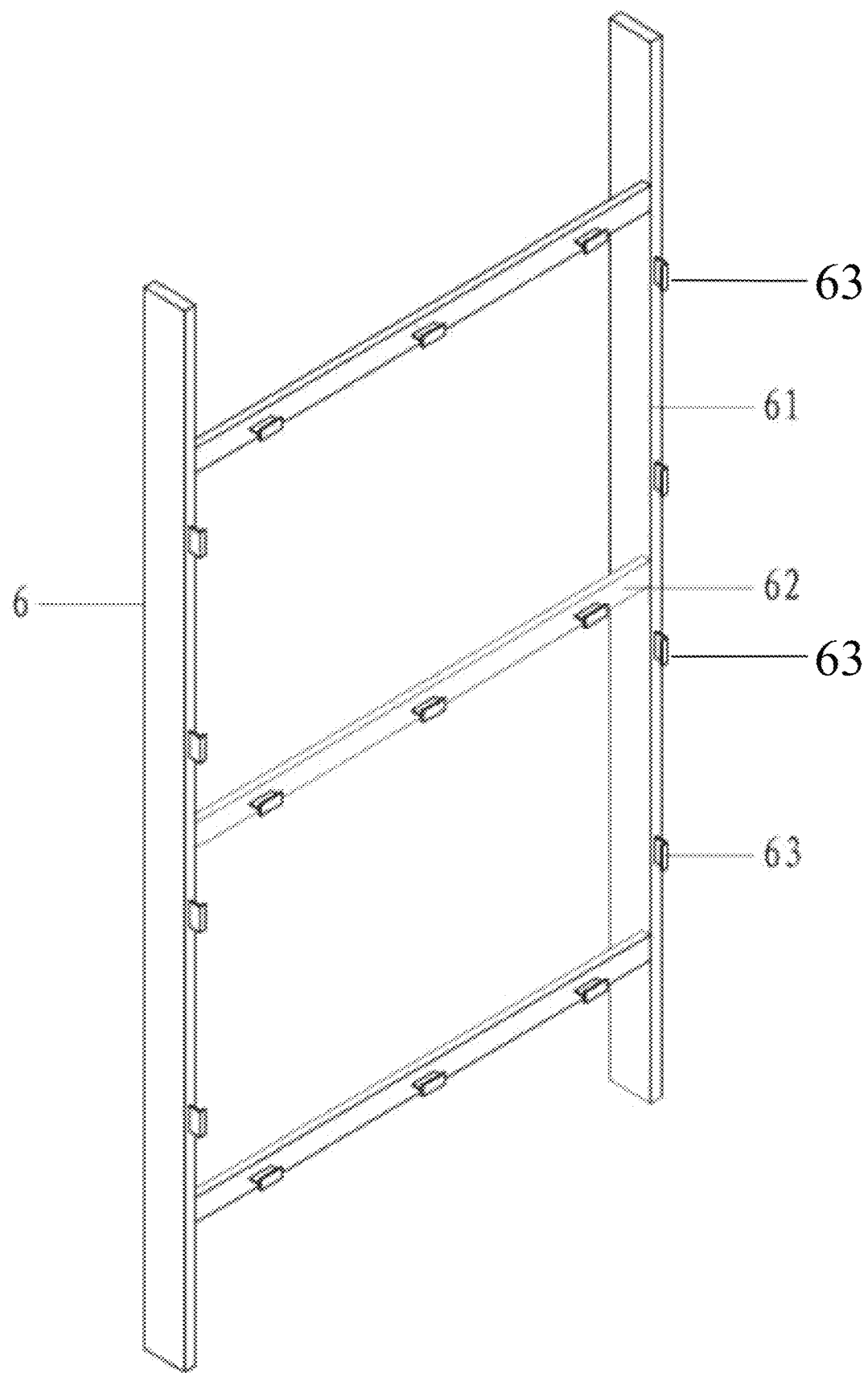
FIG. 3 is a schematic structural diagram of a supporting framework.

As shown in FIG. 3, the supporting framework 6 is mainly formed by connecting the vertical uprights 61, crosspieces 62 and the clamping members 63, and the vertical uprights 61 and the crosspieces 62 are connected through special connecting assemblies.

Figure 4:
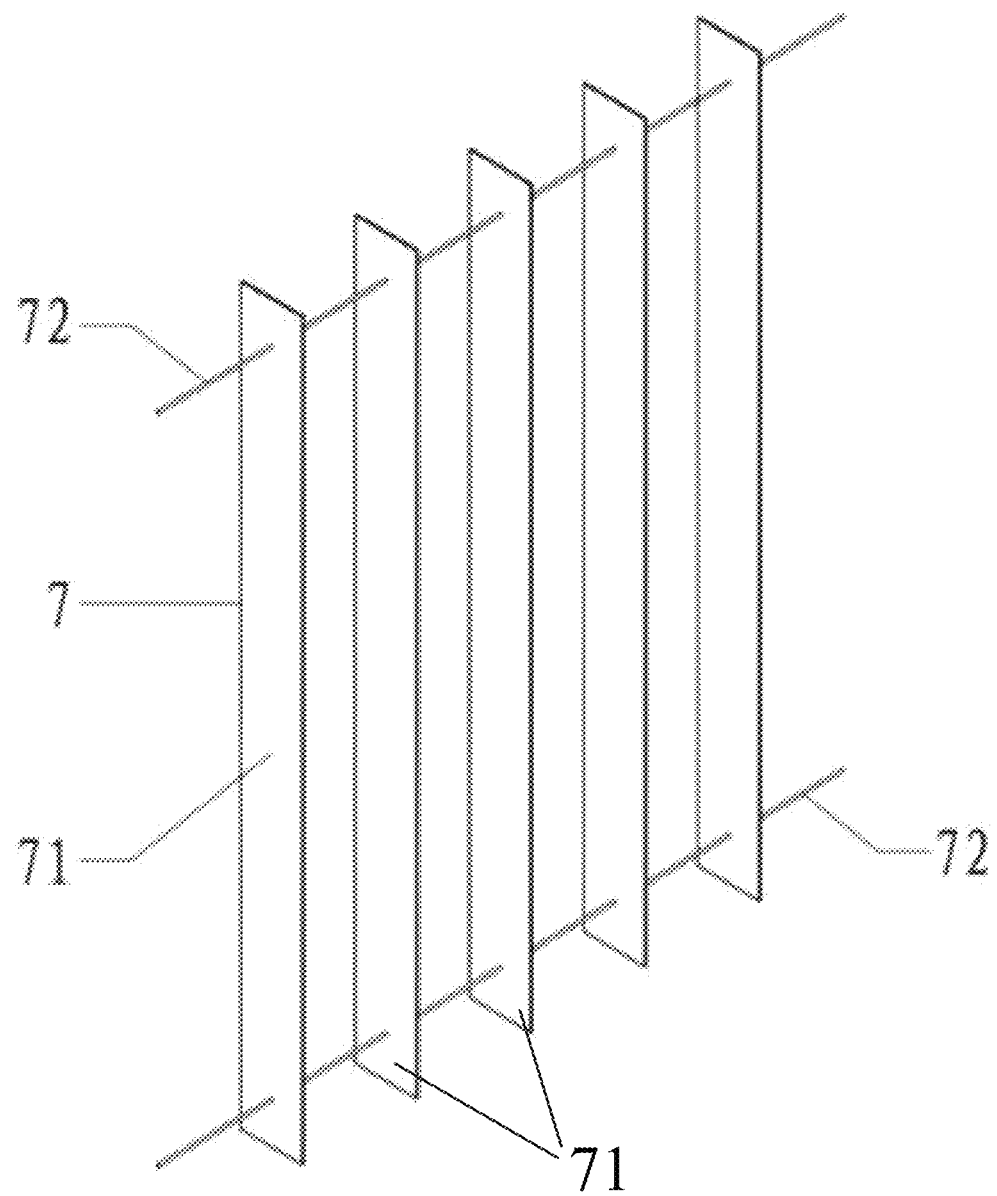
FIG. 4 is a schematic structural diagram of a flow guide component.

As shown in FIG. 4, the flow guide component 7 is composed of the flow guide plates 71 and the connecting rods 72, and the connecting rods 72 fix the plurality of flow guide plates 71 together.

The outer-layer photovoltaic assembly 8 is mainly composed of a photovoltaic panel 81 and a frame 82, the photovoltaic panel 81 is made of monocrystalline silicon, polycrystalline silicon or a compound photovoltaic material, and the frame 82 is fixed on the supporting framework 6 through the clamping members 63.

The ventilation louvers 9 may be stainless steel ventilation louvers, aluminum alloy ventilation louvers, and the like.

Specific Embodiment 2

Figure 5:
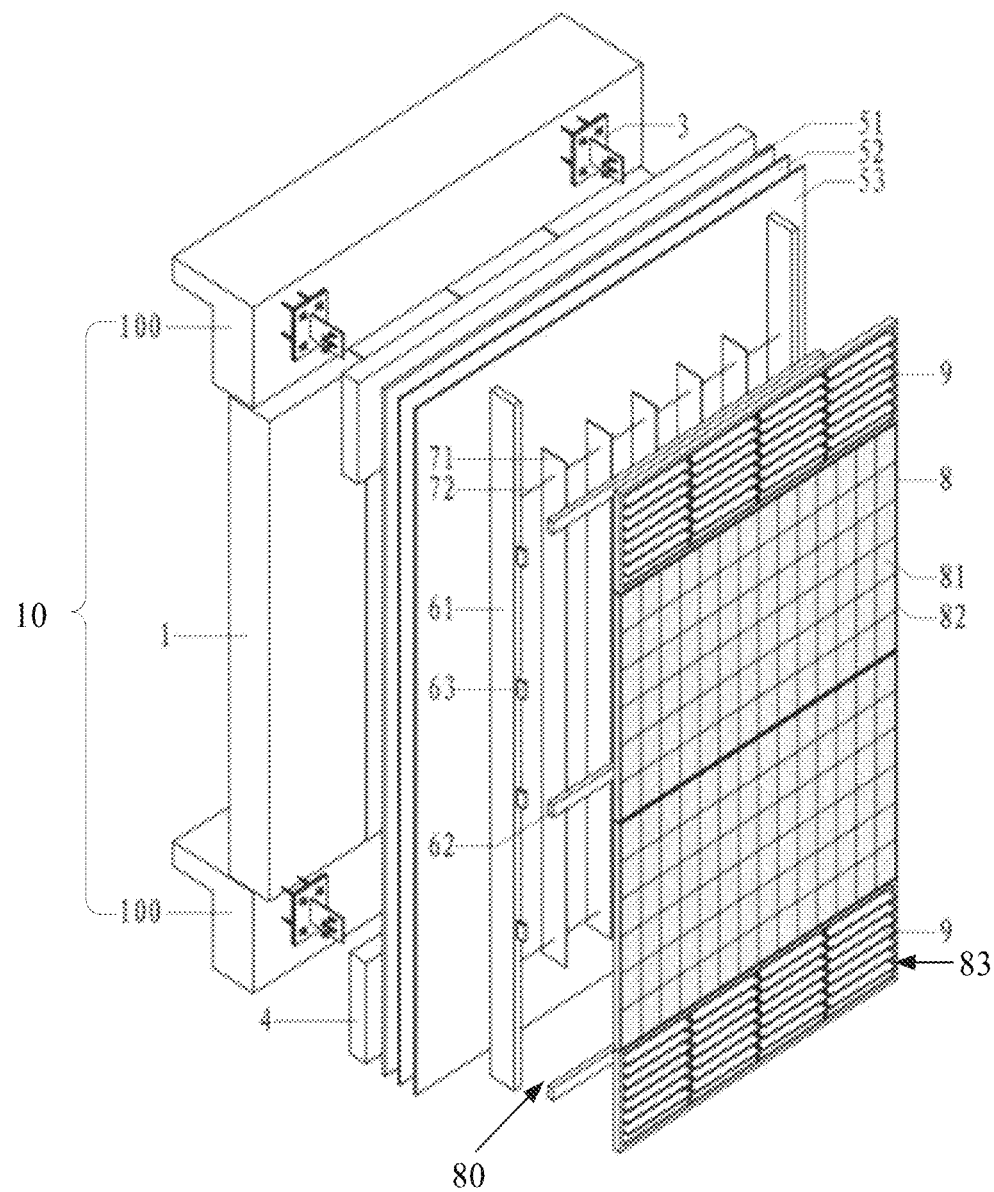
FIG. 5 is a schematic diagram of construction of the ventilation-type solar photovoltaic self-heat-preservation outer wall system.

As shown in FIG. 5, this specific embodiment provides a construction method of ventilation-type solar photovoltaic self-heat-preservation outer wall system, which comprises the following steps.

In step S1, a layout diagram of a heat preservation and structure integrated wallboard 1 is drawn.

The layout diagram of the heat preservation and structure integrated wallboard 1 is drawn according to a wallboard specification, a gap width and external wall door and window opening information, and numbers and positions of heat preservation and structure integrated wallboards 1 and wallboard connectors 2 are determined.

In step S2, the heat preservation and structure integrated wallboard 1 is mounted.

According to the layout diagram of the heat preservation and structure integrated wallboard 1, a mounting control line is ejected on a structural beam 100, and after the heat preservation and structure integrated wallboard 1 is placed in place, the heat preservation and structure integrated wallboard is connected and fixed with the structural beam 100 through the wallboard connectors 2.

In step S3, a T-shaped connecting assembly 3 is fixed.

According to a mounting position of the T-shaped connecting assembly 3, the mounting control line is ejected on the structural beam 100, a hole is drilled in the structural beam 100 by a drilling machine according to the mounting control line and a surface is cleaned, a layer of polyurethane pad 36 is pressed on a back surface of a T-shaped base 31, a metal anchor bolt 32 is driven into the hole in the structural beam 100 through an obround hole in the T-shaped base 31, and the T-shaped base 31 is connected with the structural beam 100 through the metal anchor bolt 32, a gasket 35 and a nut 34.

In step S4, local heat bridge treatment is performed.

According to a size of the structural beam 100 on the outer side, a processed heat preservation plate 4 is connected to the structural beam 100 to be located on an outer side of the structural beam 100.

In step S5, a wall surface leveling and facing structure 5 is constructed.

A layer of heat preservation slurry is scrapped on surfaces of the heat preservation and structure integrated outer wallboard 1 and the heat preservation plate 4 as a heat preservation slurry leveling layer 51 of an outer wall surface, wherein a thickness of the heat preservation slurry is 7 mm to 25 mm.

After the heat preservation slurry leveling layer 51 of the outer wall surface is dried, a layer of polymer cement mortar is scrapped, and a glass fiber mesh is pressed into the layer to form a plastering layer 52, wherein a thickness of the polymer cement mortar is 3 mm to 5 mm.

After the plastering layer 52 of polymer cement mortar is dried, a facing layer 53 is coated on an outer side of the plastering layer.

In step S6, vertical uprights 61 are mounted.

The vertical uprights 61 of the supporting framework 6 are fixed on the T-shaped connecting assembly 3 mounted in place, the vertical uprights 61 are finely adjusted through the obround holes in the T-shaped connecting assembly 3, and the vertical uprights 61 are in bolting connection through preset bolts 33 and nuts 34.

In step S7, flow guide plates 71 are fixed.

According to ventilation design in a ventilation gap, the flow guide plates 71 in given specification and number are fixed on connecting rods 72 as a flow guide component, and the flow guide plates 71 are fixed on the vertical uprights 61 through the connecting rods 72.

In step S8, a crosspiece 62 is fixed.

The crosspiece 62 is fixed in a designated position of the vertical upright 61, and the crosspiece 62 is connected with the vertical upright 61 through a special connecting assembly.

In step S9, the outer-layer photovoltaic assembly 8 and ventilation louvers 9 are mounted.

According to mounting positions of the outer-layer photovoltaic assembly 8 and the ventilation louvers 9, the outer-layer photovoltaic assembly 8 and the ventilation louvers 9 are fixed on the supporting framework 6 through preset clamping members 63.

The terms "upper", "lower", "outer side", "inner side", and the like (if any) in the specification, the claims and the above drawings of the present invention are used to distinguish relative relationships in position, without giving qualitative description. It should be understood that data used in this way may be interchanged under appropriate circumstances, so that the embodiments of the present invention described herein can be implemented in a sequence other than those illustrated or described herein. In addition, the terms "comprising" and "having" and any variations thereof are intended to cover non-exclusive inclusion.

The above descriptions of the disclosed embodiments enable those skilled in the art to implement or use the present invention. Many modifications to these embodiments will be apparent to those skilled in the art, and general principles defined herein may be implemented in other embodiments without departing from the spirit or scope of the present invention. Therefore, the present invention should not be limited to the embodiments shown herein, but should comply with the widest scope consistent with the principles and novel features disclosed herein.

The invention claimed is:

1. A ventilation-type solar photovoltaic self-heat-preservation outer wall system, comprising an inner-layer heat preservation structure and an outer-layer photovoltaic assembly, wherein a ventilation gap is formed between the inner-layer heat preservation structure and the outer-layer photovoltaic assembly, a flow guide component is arranged in the ventilation gap, the inner-layer heat preservation structure comprises a structural beam and a heat preservation and structure integrated wallboard, the heat preservation and structure integrated wallboard is mounted between upper and lower structural beams, and the flow guide component is located on an outer side of the heat preservation and structure integrated wallboard; and the flow guide component comprises a plurality of flow guide plates arranged at intervals, the flow guide plates are vertically mounted, the outer-layer photovoltaic assembly is provided with a ventilation opening, the ventilation opening is communicated with the ventilation gap, ventilation louvers are evenly arranged above and below the outer-layer photovoltaic assembly, and the ventilation opening is located at the ventilation louvers;

wherein the heat preservation and structure integrated wallboard protrudes outwards from the structural beam, the structural beam is connected with a heat preservation plate, and the heat preservation plate is located on an outer side of the structural beam;

wherein a wall surface leveling and facing structure is arranged on the outer sides of the heat preservation and structure integrated wallboard and the heat preservation plate;

wherein a supporting framework is arranged on the outer side of the heat preservation and structure integrated wallboard, and the outer-layer photovoltaic assembly is detachably mounted on the supporting framework;

wherein the supporting framework is connected to the structural beam through a T-shaped connecting assembly, the T-shaped connecting assembly is provided with an adjusting member, and a position of the supporting framework is adjusted by the adjusting member;

wherein the supporting framework comprises two vertical uprights, a crosspiece is fixedly connected between the two vertical uprights, clamping members are arranged on the crosspiece and the two vertical uprights, and the outer-layer photovoltaic assembly is connected to the clamping members, wherein the flow guide plates are arranged between the two vertical uprights;

wherein the T-shaped connecting assembly comprises a T-shaped steel plate and a metal anchor bolt, the T-shaped steel plate is connected to the structural beam through the metal anchor bolt, an obround hole is arranged in the T-shaped steel plate, the adjusting member is mounted in the obround hole, and the adjusting member connects the T-shaped steel plate with the two vertical uprights of the supporting framework.

2. The ventilation-type solar photovoltaic self-heat-preservation outer wall system according to claim 1, wherein the wall surface leveling and facing structure is between the heat preservation and structure integrated wallboard and the flow guide component.

3. The ventilation-type solar photovoltaic self-heat-preservation outer wall system according to claim 1, wherein the flow guide component comprises the plurality of flow guide plates arranged at intervals, the plurality of flow guide plates are connected through connecting rods, two ends of the connecting rods are connected to the two vertical uprights of the supporting framework, and the flow guide plates are located between the two vertical uprights.

4. The ventilation-type solar photovoltaic self-heat-preservation outer wall system according to claim 1, wherein the supporting framework is provided with the ventilation louvers, the ventilation louvers are connected with the supporting framework through the clamping members and located on an outer side the ventilation gap.

* * * * *